Feb. 2, 1960 K. JEKELIUS 2,923,768

AMPLITUDE LIMITER, PARTICULARLY FOR TELEVISION SIGNALS

Filed Aug. 18, 1954

INVENTOR
K. JEKELIUS
BY Philip M. Bolton
ATTORNEY 2,923,768
Patented Feb. 2, 1960

2,923,768

AMPLITUDE LIMITER, PARTICULARLY FOR TELEVISION SIGNALS

Kurt Jekelius, Pforzheim, Germany, assignor to International Standard Electric Corporation, New York, N.Y., a corporation of Delaware Application August 18, 1954, Serial No. 450,654

Claims priority, application Germany September 5, 1953

2 Claims. (Cl. 178—7.1)

This invention relates to amplitude limiting devices particularly for television signals.

According to a standard method of television transmission the synchronising impulses, which are necessary for synchronising the receiver, are transmitted during the blanking intervals within the range "black" to "blacker than black" of the picture modulation to be transmitted. Due to the fact that the television receiver, for reasons of economy, separates these synchronising impulses from the received picture signal by means of a simple amplitude selection, and because the synchronising circuits are sensitive to the penetration of picture signals into the synchronising channel, it is of advantage to connect into the transmission path, preferably on the transmitter side, a device which serves to prevent the penetration of picture modulation into the synchronising signal.

Systems are known in which, particularly after longer transmission stretches, the synchronising signal is completely cut off from the synchronising channel, and in which, on restoration, a completely new synchronising signal is provided, if necessary, by a built-in impulsing means. The employment of this method is recommended particularly in the case of longer transmission stretches and whenever substantial disturbances are expected in the synchronising signal. However, for various application purposes this method is not suitable. Hence there arises the desire of finding, in analogy to the already suggested white limiter, also a simple type of limiter stage for "black." The difficulty, which has to be overcome in the practical realization of such a circuit arrangement, is that in the signal to be transmitted the synchronising impulses to be transmitted are lying within the range "blacker than black." Hence a simple amplitude filter of the type used for the white limiter will not solve the problem. According to the inventive arrangement, therefore, besides the limiter tube, which effects a hard limitation of the picture signal when exceeding the adjusted amplitude threshold—in this case "black"—there is also provided means for eliminating the limiter effect during the time of the synchronising impulses. It is of advantage to connect the limiter galvanically to a point of the transmission path in which also the direct current component of the picture signal is contained, hence preferably in the grid- or anode-circuit of a black-controlled stage.

Figure 1:
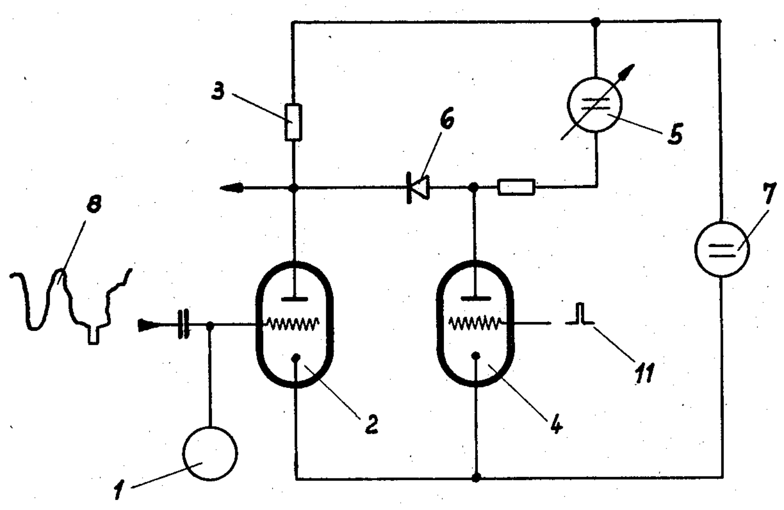
Figure 2:
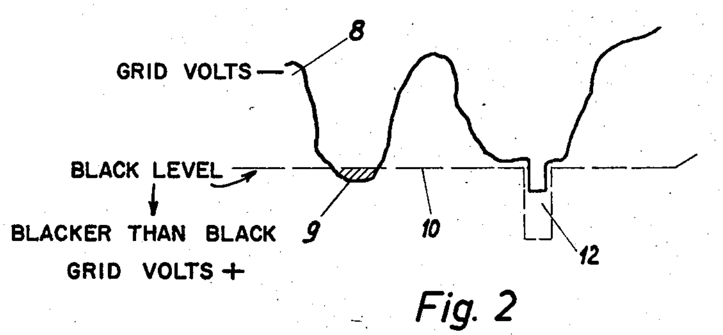

The invention will be particularly described in the following with reference to an example of an embodiment of the invention shown in the figures of the accompanying drawing, in which:

Fig. 1 shows a circuit arrangement according to an exemplified embodiment of the invention, and Fig. 2 shows a curve, with the aid of which the mode of operation of the invention will be particularly explained.

Reference numeral 1 denotes a black control of the conventional kind, to which there is connected the amplifier tube 2. In the anode circuit of the tube 2 there is arranged the external resistance 3, and in parallel to tube 2 there is arranged a keying tube 4. The diode 6 is galvanically connected with the anodes of the two tubes 2 and 4 and may be variably biased by means of the source of voltage 5. Reference numeral 7 denotes a further source of voltage.

Assume that to this arrangement there is now applied a picture voltage, e.g. 8 according to Fig. 2. In the conventional manner the working point of the amplifier tube 2 will be fixed in such a way by the black control stage 1 that, independently of the picture information, there is assigned to the value black a constant grid potential of the tube 2. However, a limitation of the signal portions exceeding the black level, e.g. 9 (the black level being denoted by 10) is not performed with the simple type of black control. This will now be achieved by the mode of operation of the arrangement described hereinafter.

The bias of the diode 6, which is galvanically connected in the anode circuit of the amplifier tube 2, is so adjusted that it will become conductive as soon as the signal voltage exceeds the black level 10. Whenever this is the case, the diode 6 will become conductive and there will result a parallel connection of the diode to the external resistance 3 of the amplifier tube 2, so that the internal resistance thereof will be reduced and the voltage will break down, viz. the signal is limited to the black value. However, there still exist the synchronizing signals in the black range. In order to prevent them from being likewise cut off, an impulse 11 from a source of impulses is applied in synchronism with the synchronising impulses to the grid of the keying tube 4. Hereby the characteristic of the diode will be displaced with the aid of the keying tube in that moment in which the synchronising impulse is applied, because the biasing potential is now e.g. increased according to the dotted line 12, Fig. 2. In this way it is safeguarded that the synchronising impulses are maintained with their full amplitude.

The exemplified embodiment of the invention, as described hereinbefore merely serves for an understanding of one manner of carrying the invention into effect and is not intended in any way to limit the scope of the invention as defined in the appended claims.

What is claimed is:

1. In a television system a source of television signals comprising picture signals and synchronizing signals, a normally conductive amplifier tube having an input circuit and an output circuit, means for applying said television signals to said input circuit, a normally non-conductive diode, one electrode of which is galvanically connected to the anode of said tube so as to vary the internal resistance of said tube when the conductivity of said diode is changed, means connected to the other electrode of said diode for applying a predetermined bias to said diode whereby it is made conductive when the television signal voltage exceeds a predetermined value to effect a limiting of said signal, and means for periodically changing said bias in synchronism with said synchronizing signals to such a value that the limiting effect of said amplifier tube is eliminated during the periods of said synchronizing signals.

2. A television system according to claim 1, in which said last-mentioned means comprises a keying tube connected to one side of said diode and having a control grid, and a source of impulses connected to said control grid for varying the impedance of said keying tube, and thereby the bias on said diode, in synchronism with said synchronising signals.

References Cited in the file of this patent

UNITED STATES PATENTS

| | | |
|---|---|---|
| 2,315,388 | Bedford | Mar. 30, 1943 |
| 2,426,710 | Sanders | Sept. 2, 1947 |
| 2,466,959 | Moore | Apr. 12, 1949 |
| 2,573,446 | Ingalls | Oct. 30, 1951 |
| 2,647,209 | Krause | July 28, 1953 |
| 2,697,747 | Baker | Dec. 21, 1954 |
| 2,794,911 | Rosier | June 4, 1957 |

FOREIGN PATENTS

| | | |
|---|---|---|
| 505,991 | Canada | Sept. 21, 1954 |